UNITED STATES PATENT OFFICE.

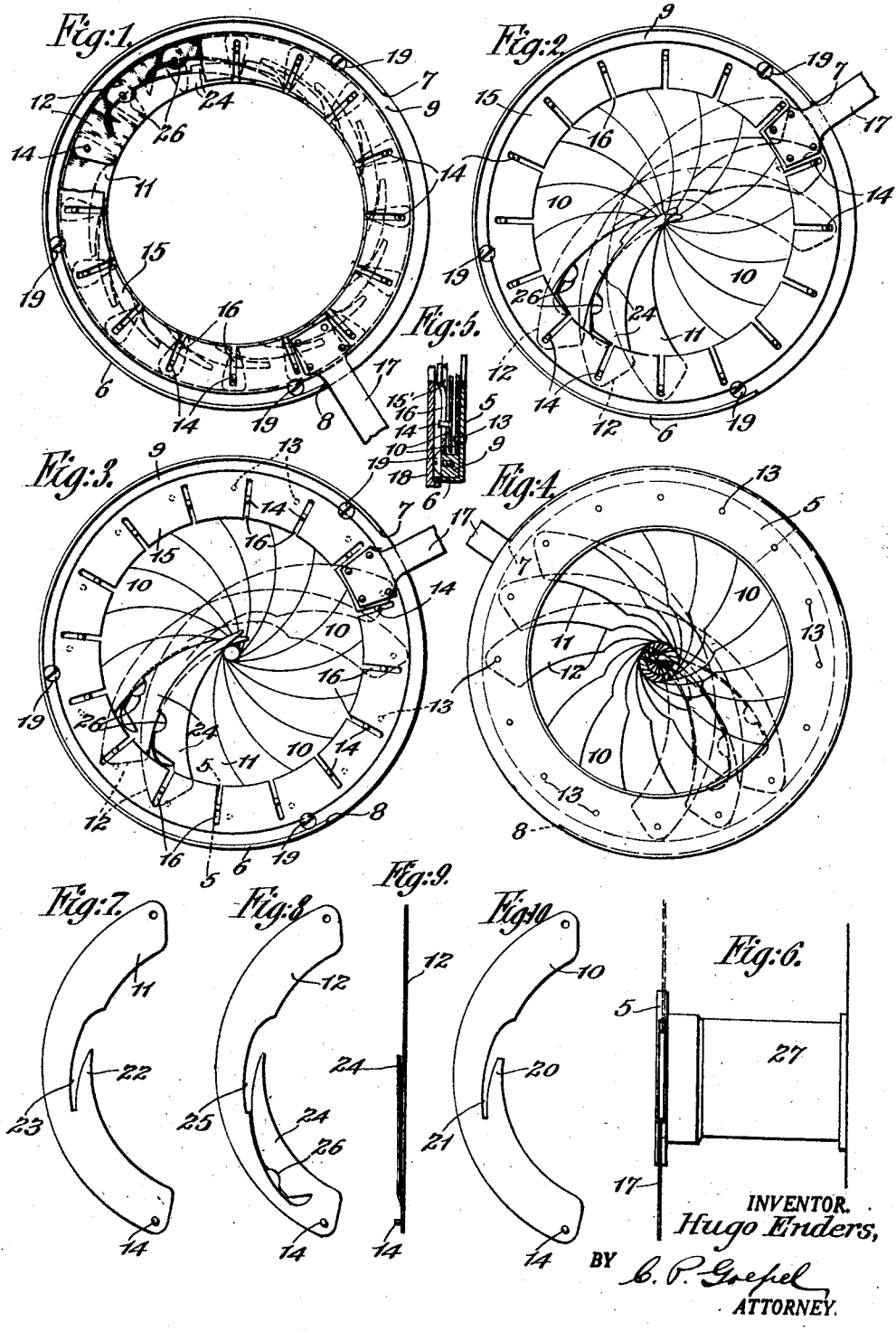

HUGO ENDERS, OF LEHIGHTON, PENNSYLVANIA.

DISSOLVING SHUTTER FOR CAMERAS.

1,388,938.      Specification of Letters Patent.      Patented Aug. 30, 1921.

Application filed May 19, 1920. Serial No. 382,498.

*To all whom it may concern:*

Be it known that I, HUGO ENDERS, a citizen of the Republic of Germany, and resident of the town of Lehighton, county of Carbon, State of Pennsylvania, have invented certain new and useful Improvements in Dissolving Shutters for Cameras, of which the following is a specification.

This invention relates to dissolving shutters for cameras. In the effort to produce novel and pleasing effects demanded by motion picture producers, a shutter for motion picture cameras has been devised and used for the purpose of creating the optical illusion of the gradual disappearance or dissolution of one scene and the opening up of a new scene. However, in so far as I am aware, no practical means has yet been produced for effecting a complete round closure of the shutter opening. In the operation of prior shutters of this character, the relatively movable shutter members or vanes have a binding action upon each other as they approach the completely closed position which effectively limits the closing movement of the vanes so that a small central aperture remains through which the focused light rays are projected upon the film. With such a shutter the complete dissolution of the image cannot be produced.

It is therefore the purpose and object of my present improvement to provide a shutter of this character in which the shutter vanes are so mounted and constructed that they will completely close the shutter opening and thereby enable the operator to cause a slowly progressing disappearance of the scene until it is entirely obliterated. The present invention may also be advantageously employed to produce a gradually fading or vignetted circle for making what is commonly termed fade-away head or bust pictures, it being only necessary to change the position of the shutter with relation to the lens.

The invention has for a more particular object to provide a very simple and compact arrangement of the several elements so that the improved shutter may be readily adapted for use in connection with the ordinary motion picture camera, and to this end, the device embodies a plurality of lapping shutter members or vanes mounted in the frame and each having a tongue cut therefrom, together with an actuating means for the vanes, said tongues assuming a superposed relation as the vanes are moved to closed position, such relation of the tongues on certain of the vanes being the reverse of the tongues on the remaining vanes and constituting means which effects the final complete closure of the shutter opening.

With the above and other objects in view the invention consists in the improved shutter for motion picture cameras as above characterized and in the form, construction, and relative arrangement of its several parts as will be hereinafter more fully explained, illustrated in the accompanying drawing, and subsequently incorporated in the subjoined claims. In the drawings wherein I have illustrated one practical embodiment of my invention and in which similar reference characters designate corresponding parts throughout the several views, Figure 1 is a front elevation of the improved shutter with the face plate removed and certain parts broken away, the shutter vanes being disposed in their completely opened positions.

Fig. 2 is a front elevation showing the shutter completely closed.

Fig. 3 is a similar view, the shutter vanes being shown in position just before the complete closing of the shutter.

Fig. 4 is a rear elevation with the shutter vanes in closed position as in Fig. 2.

Fig. 5 is a detail fragmentary section taken on the line 5—5 of Fig. 3.

Fig. 6 is a side elevation showing the shutter assembled on the lens tube of a motion picture camera.

Figs. 7 and 8 are detail elevations showing the particular form of certain of the shutter vanes.

Fig. 9 is an edge view of the vane shown in Fig. 8.

Fig. 10 is a detail elevation illustrating the construction of the remaining shutter vanes.

Referring in detail to the drawing 5 designates the back plate of the shutter frame which is provided at its perimeter with a laterally projecting flange 6, a portion of which is cut away to provide stop shoulders indicated at 7 and 8 respectively. A ring 9 is secured within the flange 6 on the frame plate in any approved manner.

The shutter includes a plurality of similarly formed members or vanes 10, and in addition thereto a single vane 11 of slightly different form as shown in Fig. 7 of the drawing and the two members or vanes 12 illustrated in Fig. 8 which differ quite materially from the vanes 10 and 11. These shutter vanes are all of the same general conformation or shape in outline and are curved in the direction of their length so that they each define somewhat less than one half of a complete annulus or ring.

Each of the shutter vanes is pivotally mounted at one of its ends, as shown at 13 upon the front side of the annular frame plate 5. The vanes are arranged in lapping relation upon each other and each extends entirely across the shutter frame opening, when in closed position. In the other end of each shutter vane a pin 14 is fixed. 15 designates an actuating member, which, as herein shown, fits snugly within the ring 9 and is in the form of an annular ring or plate. I have illustrated in the drawing a shutter construction in which sixteen of the relatively movable members or vanes are provided, though it is to be understood that more or less than this particular number may be employed. Accordingly, the annular plate 15 is provided with sixteen equidistantly spaced radially extending slots 16. These slots open upon the inner edge of the plate 15 and terminate in spaced relation to the outer edge thereof. In each of the slots 16 the pin 14 of one of the movable shutter members or vanes is pivotally and shiftably engaged.

To the annular actuating plate 15 a convenient handle or operating member 17 is fixed and projects outwardly through the space provided between the ring 9 and the face or cover plate 18 of the shutter frame. The annular plate 15 is held in its operative position with respect to the shutter frame by means of the screws 19 which are threaded in the ring 9 and the heads of which are of sufficient diameter to lap over upon the edge of the plate 15.

Each of the shutter members or vanes 10 is provided upon its inner concave edge with a flexible tongue or longitudinal extension 20 which is formed by cutting a curved longitudinally extending slot or kerf 21 in said edge of the vane. The member 11 has a tongue 22 and a kerf or slot 23 formed in its concave edge, but in this instance the tongue 22 is of greater width at the closed end of the kerf 23 and tapers to a point, wherein it differs from the tongue 20 which is relatively narrow and is blunt at its free end. The two members or vanes of the form shown in Fig. 8 are provided with the relatively long tapering longitudinally extending tongues 24 and also with a kerf 25 similar to the kerf or slot in the other shutter vanes, one side of which is partly closed by the end portion of the tongue 24. The outer longitudinal edge of the remaining portion of this tongue is free from any positive connection with the opposed edge of the vane 12 and is provided with a notch or recess 26 for the purpose of accommodating the pins 14 of adjacent shutter vanes when the vanes are moved to their open positions as seen in Fig. 1 of the drawing.

As will be seen from reference to Fig. 1, the movable shutter vanes in their open position are disposed in overlapping or superposed relation to each other and are compactly held between the shiftable actuating plate 15 and the shutter frame plate 5. In the closing of the shutter, the handle member 17 is moved from its position in contact with the stop shoulder 8 in an upward direction to thereby circumferentially shift the actuating plate 15. In this movement of the actuating plate, the shutter members or vanes are caused to move with respect to each other, the pins 14 shifting back and forth in the slots 16. The curved vanes are of such diameter that their inner edges together at all times define what is substantially a true circular opening through which the light rays may be projected from the lens upon the film. As the movement of the handle 17 is continued toward the stop shoulder 7 this opening gradually becomes smaller and the tongues 20 and 22 of the shutter vanes 10 and 11 assume a superposed relation as is clearly shown in Fig. 4 of the drawing. However, there still remains a slight opening at one side of the superposed tongues 20 and 22. This opening is finally closed by the overlapping tongues 24 of the adjacent shutter vanes 12. It will be noted from reference to Fig. 3 that the tongues 24 are disposed in reverse overlapping or superposed relation to the tongues of the remaining shutter vanes and are so positioned with respect to the superposed tongues 20 that they will effectively prevent the direct projection of light rays around the tongues 20 and through the shutter. As seen in Fig. 9 of the drawing the vanes 24 are offset from the plane of the members 12 and may freely flex with respect thereto in the movement of the shutter members or vanes to their open and closed positions. Thus, the shutter can be actuated as slowly as may be desired with the assurance of a final complete disappearance of the picture. This result is accomplished when the handle 17 is brought into abutting contact with the shoulder 7. The inner edge of the shiftable annular plate 15 is slightly bent or turned outwardly as shown at 15' in Fig. 5, so that the shutter members or vanes may readily move into the space between said plate and the shutter frame plate 5 without binding.

In Fig. 6 of the drawing I have shown my improved shutter mounted upon the end of a lens tube 27 with which the motion picture camera is equipped. Any suitable means may be provided whereby the shutter frame can be easily and quickly mounted in operative relation to the lens and adjusted with respect thereto. It is also quite a common practice in the art to employ such a dissolving shutter in conjunction with a square or rectangular dissolver so that the four sides of a rectangle within which the projected picture is contained may appear to move inwardly toward the center until the picture finally disappears altogether by the complete closing of the shutter as above explained. In this case, the shutter and the slide plates of the square dissolver should be arranged as far in advance of the camera lens as possible.

From the foregoing description considered in connection with the accompanying drawing, the construction, manner of operation and several advantages of my improved dissolving shutter will be clearly understood. The device is relatively simple in its construction, reliable and effective for the purpose in view and may be produced at comparatively small manufacturing cost. While I have herein referred to one actuating means for the movable shutter vanes, it is apparent that other analogous means may be substituted therefor. The shutter may of course be made in various sizes and the individual shutter members or vanes can be produced from sheet metal or a suitable opaque transparent or colored composition material, as may be preferred.

Accordingly, it is to be borne in mind that while I have herein illustrated and described an exemplification of my invention which has given very satisfactory results in practical use, the device may nevertheless be embodied in many other alternative constructions, and I accordingly reserve the privilege of adopting all such legitimate changes in the form, construction, and arrangement of the several elements as may be fairly embodied within the spirit and scope of the invention as claimed.

For instance, my improved dissolving shutter may also be used in lens barrels for photographic lenses, where it will take the place of the regular iris diaphragm which is generally supplied with such lenses, for which purpose it is especially well adapted on account of its comparatively small size in relation to its full opening.

I claim:

1. A dissolving shutter for cameras comprising a shutter frame, a plurality of vanes mounted in said frame, a shiftable actuating member to which said vanes are operatively connected, said vanes lapping upon each other and each having a part assuming a superposed relation to the corresponding part of an adjacent vane in the closing movement of said vanes to thereby effect a complete closure of the shutter opening.

2. A dissolving shutter for cameras comprising a shutter frame, a plurality of vanes pivotally mounted at one of their ends upon said frame, a shiftable actuating member to which said vanes are operatively connected at their other ends, said vanes lapping upon each other and movable across the shutter opening when said member is shifted in one direction, each of said vanes having a part assuming a superposed relation to the corresponding part of an adjacent vane in the closing movement of said vanes and such superposed parts effecting the final complete closure of the shutter opening.

3. A dissolving shutter for cameras comprising a shutter frame, a plurality of vanes pivotally mounted upon said frame at one of their ends, a shiftable actuating member to which said vanes are operatively connected at their other ends, said vanes being movable across the shutter opening to close the same in a shifting movement of said member in one direction, each of the vanes having a longitudinally extending tongue flexing with respect to the vane in the movement thereof and assuming a superposed relation to the tongue of an adjacent vane, such superposed tongues effecting the final complete closure of the shutter opening.

4. A dissolving shutter for cameras comprising a shutter frame, a plurality of vanes pivoted at one of their ends upon said frame in spaced relation to each other, a circumferentially shiftable actuating member mounted in the frame and to which the vanes are pivotally connected at their other ends whereby the vanes are moved across the shutter opening to close the same when said member is shifted in one direction, certain of the vanes having longitudinally extending tongues cut therefrom assuming a superposed relation to each other as the vanes move toward their closed position and effecting the final complete closure of the shutter opening.

5. A dissolving shutter for cameras comprising a shutter frame, a plurality of arcuately curved vanes pivoted at one of their ends upon said frame, a shiftable actuating member to which the vanes are operatively connected at their other ends, each of said vanes having a yieldable tongue on its inner edge and extending longitudinally thereof, said actuating member when shifted in one direction moving said vanes across the shutter opening and causing the tongues thereon to assume a superposed relation and effect the complete closure of the shutter opening.

6. A dissolving shutter for cameras comprising a shutter frame, a plurality of vanes pivoted at one of their ends upon said frame in spaced relation to each other, a circumferentially shiftable actuating member mounted in the frame and to which said vanes are operatively connected at their other ends, each of said vanes having a longitudinal tongue, said tongues assuming a superposed relation in the closing movement of the vanes, the tongues of two adjacent vanes being reversely superposed with respect to the tongues of the remaining vanes and constituting means for effecting the final complete closure of the shutter opening.

7. A dissolving shutter for cameras comprising a shutter frame, a plurality of arcuately curved vanes pivoted at one of their ends upon said frame, a shiftable actuating member operatively connected to the other ends of said vanes, each of said vanes having a yieldable tongue on its inner edge and the tongues of certain vanes being of greater length than the tongues of the remaining vanes, said vanes lapping upon each other and moving toward a closed position when said member is shifted in one direction and said tongues assuming a superposed relation in such relative movement of the vanes, such relation of the longer tongues being the reverse of the superposed relation of the shorter tongues and effecting the final complete closure of the shutter opening.

In testimony that I claim the foregoing as my invention, I have signed my name.

HUGO ENDERS.